US009507079B2

(12) United States Patent
Park et al.

(10) Patent No.: US 9,507,079 B2
(45) Date of Patent: Nov. 29, 2016

(54) DISPLAY APPARATUS

(71) Applicant: SAMSUNG DISPLAY CO., LTD., Yongin, Gyeonggi-Do (KR)

(72) Inventors: Joo Hyuk Park, Asan-si (KR); Yoon Ki Hong, Gunpo-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 208 days.

(21) Appl. No.: 14/285,737

(22) Filed: May 23, 2014

(65) Prior Publication Data

US 2015/0160405 A1    Jun. 11, 2015

(30) Foreign Application Priority Data

Dec. 6, 2013 (KR) ........................ 10-2013-0151696

(51) Int. Cl.
*G02F 1/1333* (2006.01)
*F21V 8/00* (2006.01)

(52) U.S. Cl.
CPC .......... *G02B 6/0085* (2013.01); *G02B 6/0081* (2013.01); *G02F 1/133308* (2013.01); *G02B 6/009* (2013.01); *G02F 2001/133317* (2013.01)

(58) Field of Classification Search
CPC ............ G02F 1/133308; G02F 2001/133317; G02F 2201/503; G02F 1/133608; G02F 1/134309; G02F 2001/133314; G02F 2001/133388; G02F 2001/13332; G02F 1/1303; G02F 2001/133776; G02F 2201/40; G02F 1/1333; G02F 1/13336; G02F 2202/28; G02F 1/133528; G02F 1/133615; G02F 2001/133311; G02B 6/0081; G02B 6/0085; G02B 6/009; G02B 6/0086; G02B 7/00; G02B 6/0088; G02B 6/0073
See application file for complete search history.

(56) References Cited

U.S. PATENT DOCUMENTS

| 5,410,454 A * | 4/1995 | Murase ................ G02B 6/0043 362/223 |
| 5,666,172 A | 9/1997 | Ida et al. |
| 7,764,331 B2 | 7/2010 | Choi et al. |
| 8,164,583 B2 | 4/2012 | Hatakeyama |
| 2002/0126461 A1 * | 9/2002 | Yazaki ................ H05K 7/142 361/752 |
| 2005/0184637 A1 | 8/2005 | Sugawara et al. |
| 2006/0279536 A1 * | 12/2006 | Choi ..................... G06F 1/1601 345/156 |
| 2007/0171626 A1 * | 7/2007 | Chang ............... G02F 1/133602 362/97.3 |
| 2008/0297696 A1 * | 12/2008 | Banerjee .............. G02B 5/3058 349/65 |
| 2009/0147171 A1 * | 6/2009 | Yang ................. G02F 1/133308 349/58 |
| 2010/0061119 A1 * | 3/2010 | Guo ..................... G02B 5/0221 362/625 |
| 2010/0165244 A1 * | 7/2010 | Shin .................. G02F 1/133308 349/62 |
| 2010/0182768 A1 * | 7/2010 | Yun ................... G02F 1/133604 362/97.1 |
| 2013/0234921 A1 * | 9/2013 | Tang .................... G02B 6/0031 345/102 |
| 2014/0204310 A1 * | 7/2014 | Lee ................... G02F 1/133308 349/62 |

FOREIGN PATENT DOCUMENTS

| JP | 2991052 B2 | 10/1999 |
| JP | 2002031791 A | 1/2002 |
| JP | 2004253187 A | 9/2004 |
| JP | 2008170691 A | 7/2008 |
| JP | 2013025330 A | 2/2013 |
| KR | 100640889 B1 | 11/2006 |
| KR | 100694516 B1 | 3/2007 |
| KR | 100727166 B1 | 6/2007 |
| KR | 100822052 B1 | 4/2008 |
| KR | 101084858 B1 | 11/2011 |
| KR | 1020130064507 A | 6/2013 |

* cited by examiner

*Primary Examiner* — Anh Mai
*Assistant Examiner* — Fatima Farokhrooz
(74) *Attorney, Agent, or Firm* — Cantor Colburn LLP

(57) ABSTRACT

A display apparatus includes a display panel displaying an image, a backlight unit, and a top cover. The backlight unit includes a bottom cover including a first bottom cover as a bottom surface and a second bottom cover extending from the first bottom cover. The top cover includes first and second top covers. The first top cover covers an edge of an upper surface of the display panel and the second top cover is connected to the first top cover and extends in a direction inclined with respect to a direction in which the first top cover extends. An edge of the backlight unit is more outwardly protruded than an edge of the first top cover when viewed in a plan view, and the second bottom cover extends in a direction substantially parallel to the second top cover.

19 Claims, 5 Drawing Sheets

DISPLAY APPARATUS

This application claims priority to Korean Patent Application No. 10-2013-0151696, filed on Dec. 6, 2013, and all the benefits accruing therefrom under 35 U.S.C. §119, the contents of which are hereby incorporated by reference in its entirety.

BACKGROUND

1. Field

The invention relates to a display apparatus. More particularly, the invention relates to a display apparatus having improved display quality.

2. Description of the Related Art

A non-self emissive display apparatus, such as a liquid crystal display apparatus, an electrophoretic display apparatus, an electrowetting display apparatus, etc., includes a separate backlight unit to provide light to a display panel.

The display apparatus includes the display panel displaying an image, the backlight unit and a top cover. The top cover covers an edge of the display panel and the backlight unit and combines the display panel with the backlight unit.

The backlight unit is classified into an edge-illumination type backlight unit and a direct-illumination type backlight unit according to the position of a light source thereof with respect to a display screen on which the image is displayed.

SUMMARY

In a relatively high-priced display apparatus, research has been actively performed to reduce a size of a bezel of the display apparatus by reducing a width of a top cover thereof. When the width of the top cover is reduced, securing a sufficient distance between a light source unit and a light guide plate of a backlight unit of the display apparatus may be difficult. In addition, when the light guide plate used for an edge-illumination type backlight unit thermally expands, the light guide plate may apply pressure to a display panel of the display apparatus. As a result, a display quality of the display apparatus is lowered. Further, when the width of the top cover is reduced, a heat discharging structure used to discharge heat generated in the light source unit becomes smaller in volume, and thus the backlight unit is deteriorated.

In a relatively low-priced display apparatus, a structure is required to improve the display quality while reducing a size of the bezel of the display apparatus.

One or more exemplary embodiment of the invention provides a display apparatus capable of improving a discharge efficiency of a light source unit.

One or more exemplary embodiment of the invention provides a display apparatus capable of preventing a light leakage from occurring at an edge of a light guide plate.

One or more exemplary embodiment of the invention provides a display apparatus capable of reducing or effectively preventing the light guide plate from being expanded in a direction substantially vertical to a display panel.

An exemplary embodiment of the invention provides a display apparatus including a display panel which displays an image, a backlight unit, and a top cover.

The backlight unit supplies a light to the display panel and includes bottom cover. The bottom cover includes a bottom portion, and a sidewall portion extending from the bottom portion.

The top cover includes a top portion and a sidewall portion. The top portion covers an edge of an upper surface of the display panel. The sidewall portion is connected to the top portion, covers a side surface of the display panel and a side surface of the backlight unit, and extends in a direction inclined with respect to a direction in which the top portion extends.

An edge of the backlight unit is more outwardly protruded than an edge of the top portion of the top cover, in a plan view. The sidewall portion of the bottom cover extends in a direction substantially parallel to the sidewall portion of the top cover.

An angle formed by the top portion of the top cover and the sidewall portion of the top cover may be an obtuse angle.

An angle formed by the sidewall portion of the top cover and a thickness direction of the display panel may be an acute angle.

An angle formed by the bottom portion of the bottom cover and the sidewall portion of the bottom cover may be the acute angle.

The backlight unit may further include a light source unit, a light guide plate, a reflection plate, optical sheets and a fixing bar. The light source unit may include a light source which generates and emits the light, and a light source printed circuit board which drives the light source. The light guide plate may guides the light provided from the light source and allow the light to travel upward therefrom. The reflection plate may be under the light guide plate and reflect the light leaked from the light guide plate. The optical sheets may be on the light guide plate and increase a light efficiency of the light exiting from the light guide plate. The fixing bar may fix the light source unit and discharge heat generated from the light source unit.

The fixing bar may include a bottom part and a sidewall part. The bottom part may be on the bottom portion of the bottom cover. The sidewall part may extend from the bottom part. The light source unit may be coupled to an inner surface of the sidewall part.

The sidewall part may have a shape corresponding to a space defined between the bottom portion of the bottom cover and the sidewall portion of the bottom cover. The sidewall part may have a thickness which increases in a direction toward the bottom part of the fixing bar.

The display apparatus may further include a mold frame between the top cover and the bottom cover and coupled to the top cover and the bottom cover.

The mold frame may include a first mold frame portion and a second mold frame portion. The first mold frame portion may extend in a direction substantially parallel to the top portion of the top cover and support the display panel. The second mold frame portion may extend in a direction substantially parallel to the sidewall portion of the top cover.

An angle formed by the second mold frame portion and a thickness direction of the display panel may be an acute angle.

Another exemplary embodiment of the invention provides a display apparatus including a display panel which displays an image, a backlight unit, and a top cover.

The backlight unit supplies the light to the display panel. The backlight unit includes a bottom cover. The bottom cover includes a bottom portion, and a sidewall portion extending from the bottom portion.

The top cover includes a top portion, a first sidewall portion, and a second sidewall portion. The top portion covers an edge of an upper surface of the display panel. The first sidewall portion is connected to the top portion and covers a portion of a side surface of the display panel and a portion of a side surface of the backlight unit. The second sidewall portion covers a remaining portion of the side surface of the display panel and a remaining portion of the side surface of the backlight unit. The second sidewall portion extends in a direction inclined with respect to a direction in which the top portion of the top cover extends.

An edge of the backlight unit is more outwardly protruded than an edge of the top portion of the top cover, in a plan view. The sidewall portion of the bottom cover extends in a direction substantially parallel to the sidewall portion of the top cover.

The top portion of the top cover and the sidewall portion of the top cover may form a right angle.

An angle formed by the second sidewall portion of the top cover and a thickness direction of the display panel may be an acute angle.

According to one or more exemplary embodiment of the invention, the heat discharge efficiency of the light source unit may be improved. In addition, the display apparatus may reduce or effectively prevent the light leakage from occurring at the edge of the light guide plate. Further, the display apparatus may reduce or effectively prevent the light guide plate from being expanded in the direction vertical to the display panel.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
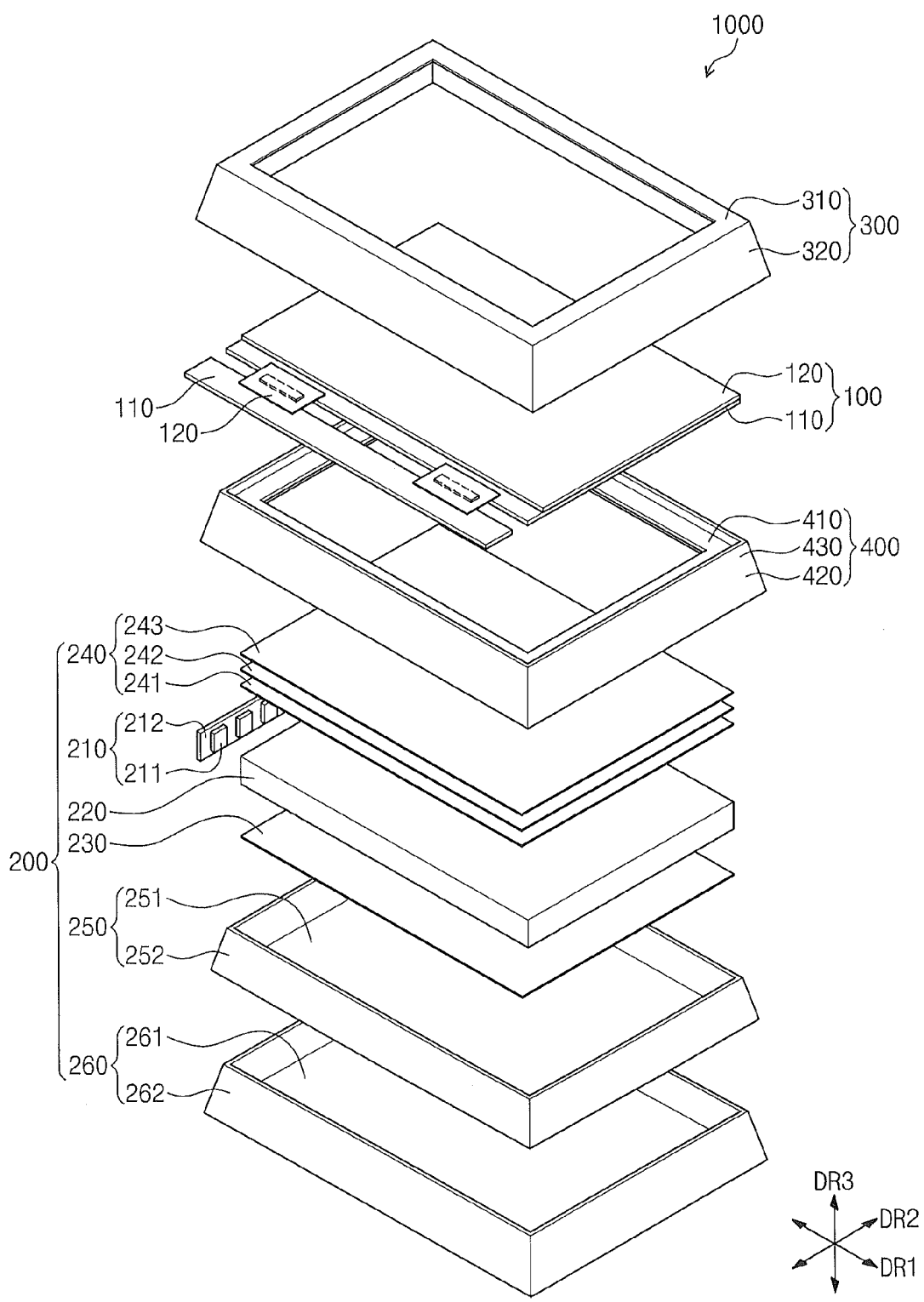
FIG. 1 is an exploded perspective view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "under," "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
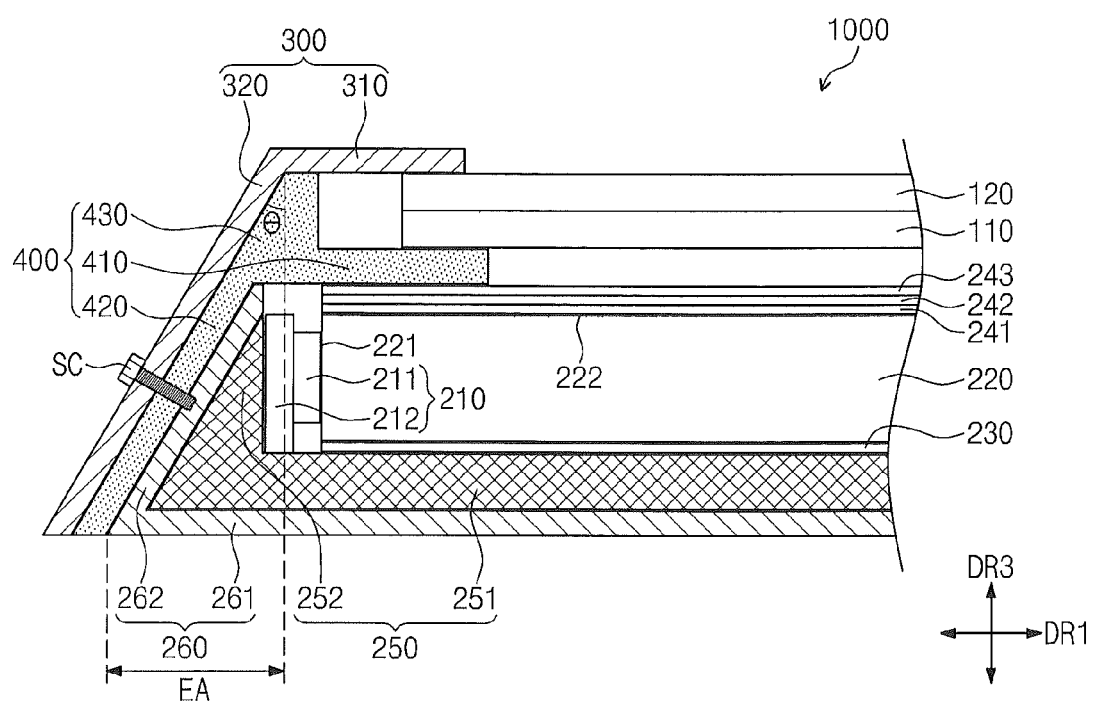
FIG. 2 is a cross-sectional view showing an enlarged portion of the display apparatus shown in FIG. 1.

FIG. 1 is an exploded perspective view showing an exemplary embodiment of a display apparatus 1000 according to the invention and FIG. 2 is a cross-sectional view showing an enlarged portion of the display apparatus shown in FIG. 1.

Referring to FIGS. 1 and 2, the display apparatus 1000 includes a display panel 100, a backlight unit 200, a top cover 300 and a mold frame 400.

The display panel 100 receives a light from the backlight unit 200 and displays an image. The display panel 100 is a non-self emissive display panel such as a liquid crystal display panel, but the invention is not limited thereto or thereby. Hereinafter, the liquid crystal display panel will be described as the display panel 100.

The display panel 100 includes a lower substrate 110, an upper substrate 120 facing the lower substrate 110, and a liquid crystal layer (not shown) disposed between the lower substrate 110 and the upper substrate 120. The lower substrate 110 includes a plurality of gate lines, a plurality of data lines, and a plurality of pixels. In one exemplary embodiment, the pixels may be defined by the gate lines and the data lines, but the invention is not limited thereto or thereby. Each pixel includes a thin film transistor. The upper substrate 120 includes a color filter and a black matrix. The color filter is disposed to correspond to a pixel. The black matrix is disposed adjacent to an edge of the color filter and covers the gate lines, the data lines and the thin film transistor in a plan view (e.g., top plan view).

When the display panel 100 has a rectangular plate shape, a direction in which a first side of a surface of the display panel 100 extends is referred to as a first direction DR1, a direction in which a second side adjacent to the first side extends is referred to as a second direction DR2, and a thickness direction of the display panel 100 is referred to as a third direction DR3. In FIG. 1, the first side is a long side and the second side is a short side, but the invention is not limited thereto or thereby. That is, the first and second sides may be the short and long sides, respectively, according to embodiments.

The display apparatus 1000 may further include a printed circuit board 110 and a flexible printed circuit board 120. The printed circuit board 110 includes a driving part mounted thereon. The driving part generates various driving signals and applies the driving signals to the display panel 100 through the flexible printed circuit board 120. The flexible printed circuit board 120 is electrically connected between the display panel 100 and the printed circuit board 110. The flexible printed circuit board 120 may be a tape carrier package ("TCP") or a chip on film ("COF").

In addition, the display apparatus 1000 may further include polarizing plates (not shown) respectively disposed on (e.g., above) and under the display panel 100 in the third direction DR3, to face each other. In an exemplary embodiment, the polarizing plates (not shown) have optical axes substantially perpendicular to each other, but the invention is not limited thereto or thereby.

The backlight unit 200 includes a light source unit 210, a light guide plate 220, a reflection plate 230, optical sheets 240, a fixing bar 250 and a bottom cover 260.

The light source unit 210 includes a light source 211 and a light source printed circuit board 212. One or more light source 211 is mounted on the light source printed circuit board 212. The light source 211 is applied with a source voltage from the light source printed circuit board 212, to generate and emit the light. The light source 211 may be, but is not limited to, a light emitting diode. The light source printed circuit board 212 receives the source voltage from outside thereof and applies the source voltage to the light source 211.

In the illustrated exemplary embodiment, the light source 211 includes the light emitting diode, but the invention is not limited thereto or thereby. In another exemplary embodiment, for instance, the light source 211 may be a cold cathode fluorescent lamp ("CCFL") or a flat fluorescent lamp ("FFL").

FIGS. 1 and 2 show one light source unit 210, but the display apparatus 1000 may include a number of light source units 210 such as two or more. In addition, the light source unit 210 is disposed to correspond to a side surface of the light guide plate 220 in FIGS. 1 and 2, but the position of the light source unit 210 should not be limited thereto or thereby.

The light guide plate 220 guides the light incident thereto and emitted from the light source 211 and allows the light to travel upward from the light guide plate 220 toward the display panel 100.

The light guide plate 220 has a plate shape with an incident surface 221 and an exiting surface 222. In FIG. 1, the light guide plate 220 has a rectangular shape in the plan view. The light emitting from the light source 221 is incident to the incident surface 221 and exits from the light guide plate 220 through the exiting surface 222.

The reflection plate 230 is disposed under the light guide plate 220. The reflection plate 230 reflects the light leaked from the light guide plate 220 that is not directed to the display panel 100 among the light emitted from the light source 211.

The optical sheets 240 are disposed on the light guide plate 220 and improve optical efficiency of the light exiting from the light guide plate 220.

The optical sheets 240 include a diffusion sheet 241, a condensing sheet 242 and a protective sheet 243. The diffusion sheet 241 diffuses the light incident thereto. The condensing sheet 242 condenses the light diffused by the diffusion sheet 241 to enhance brightness. The protective sheet 243 protects the condensing sheet 242 and secures a viewing angle. FIGS. 1 and 2 show three optical sheets 241, 242 and 243, but the number of the optical sheets 240 may be four or more.

The fixing bar 250 fixes the light source unit 210 relative to other elements of the display apparatus 1000 and discharges heat generated in the light source unit 210.

The fixing bar 250 includes a bottom part 251 and a sidewall part 252. The bottom part 251 is disposed under the light guide plate 220 and has a shape corresponding to that of the light guide plate 220 in the plan view. The sidewall part 252 extends from the bottom part 251, such as from an end or edge of the bottom part 251. The light source unit 210 is coupled to an inner surface of the sidewall part 252. The fixing bar 250 includes a metal material having relatively high thermal conductivity, such as aluminum or aluminum alloy. In an exemplary embodiment of manufacturing the display apparatus 1000, the fixing bar 250 may be formed by various methods, e.g., an extruding method, a plating method, a casting method, etc. The shape of the fixing bar 250 will be described in detail later.

The bottom cover 260 accommodates the light source unit 210, the light guide plate 220, the reflection plate 230, the optical sheets 240 and the fixing bar 250 in a receiving space defined therein.

The bottom cover 260 includes a first bottom cover portion 261 and a second bottom cover portion 262. The first bottom cover portion 261 provides a bottom surface and the second bottom cover portion 262 extends from the first bottom cover portion 261, such as from an end or edge of the first bottom cover portion 261. The first bottom cover portion 261 and the second bottom cover portion 262 may also be referred to as a bottom portion and a sidewall portion of the bottom cover 260. The shape of the bottom cover 260 will be described in detail later.

The top cover 300 covers a portion of an upper surface of the display panel 100 and is coupled to the mold frame 400 and the bottom cover 260.

The top cover 300 includes a first top cover portion 310 and a second top cover portion 320. The first top cover portion 310 covers the edge of the upper surface of the display panel 100 and has a substantially rectangular ring shape with an opening defined therein. The first top cover portion 310 includes extension portions which are elongated in a direction, and a width of the extension portion may be taken in a direction perpendicular to the direction in which the extension portion is elongated. The second top cover portion 320 extends from the first top cover portion 310, such as from an end or edge of the first top cover portion 310. The second top cover portion 320 covers side surfaces of the display panel 100 and the backlight unit 200.

The first top cover portion 310 extends in a direction substantially parallel to the upper surface of the display panel 100. The second top cover portion 320 extends in a direction inclined to the extension direction of the first top cover portion 310.

An angle formed by the first and second top cover portions 310 and 320 may be an obtuse angle with respect to a plane defined by the first and second directions DR1 and DR2. In other words, an angle between the second top cover portion 320 and the third direction DR3 may be an acute angle (θ).

The mold frame 400 is disposed between and coupled to the top cover 300 and the bottom cover 260. The mold frame 400 includes a first mold frame portion 410 and a second mold frame portion 420. The first mold frame portion 410 and the second mold frame portion 420 may also be referred to as a top portion and a sidewall portion of the mold frame 400.

The first mold frame portion 410 supports the display panel 100. The first mold frame portion 410 may have a substantially rectangular ring shape with an opening defined therein. The light source unit 210, the light guide plate 220, the reflection plate 230, the optical sheets 240 and the fixing bar 250 are disposed between the first mold frame portion 410 and the bottom cover 260.

The second mold frame portion 420 extends from the first mold frame portion 410. The second mold frame portion 420 is disposed between the second top cover portion 320 and the second bottom cover portion 262 and coupled to the second top cover portion 320 and the second bottom cover portion 262.

The first mold frame portion 410 extends in a direction substantially parallel to the first top cover portion 410. The second mold frame portion 420 extends in a direction substantially parallel to the second top cover portion 320.

An angle formed by the first and second mold frame portions 410 and 420 may be an obtuse angle with respect to the plane defined by the first and second directions DR1 and DR2. In other words, an angle between the second mold frame portion 420 and the third direction DR3 may be the acute angle (θ).

The mold frame 400 may further include a third mold frame portion 430. The third mold frame portion 430 is protruded from the first mold frame portion 410 in the third direction DR3 in order to support the first top cover portion 310.

The first bottom cover portion 261 extends in the direction substantially parallel to the first top cover portion 410. The second bottom cover portion 262 extends in the direction substantially parallel to the second top cover portion 420. An angle formed by the first and second bottom cover portions 261 and 262 may be the acute angle (θ) with respect to the plane defined by the first and second directions DR1 and DR2.

The sidewall part 252 has a shape corresponding to the space extending in the third direction DR3 and defined between the first bottom cover portion 261 and the second bottom cover portion 262. Accordingly, the sidewall part 252 has a thickness taken parallel to the plane defined by the first and second directions DR1 and DR2, which increases in a direction towards the bottom part 251.

The display apparatus 1000 may further include an engaging member SC. The engaging member SC is engaged with the second top cover portion 320, the second mold frame portion 420 and the second bottom cover portion 262 while sequentially passing through the second top cover portion 320, the second mold frame portion 420 and the second bottom cover portion 262 portion. The engaging member SC may pass partially through or completely through the aforementioned members of the display apparatus 1000. The engaging member SC may be a screw, a bolt or a boss. The engaging member SC is engaged in a direction vertical (e.g., normal) to direction in each of the second top cover portion 320, the second mold frame portion 420 and the second bottom cover portion 262 extends.

According to the illustrated exemplary embodiment of the display apparatus 1000, the backlight unit 200 is more outwardly protruded than the first top cover portion 310 in a direction parallel to the plane defined by the first direction DR1 and the second direction DR2.

The second top cover portion 320 is inclined by the acute angle (θ) with respect to the third direction DR3, and the second mold frame portion 420 and the second bottom cover portion 262 are disposed to be substantially in parallel to the second top cover portion 320. Therefore, an edge of the first bottom cover portion 261 is more outwardly protruded than an edge of the first top cover portion 310 adjacent to the second top cover portion 320 by the extension area EA.

The space is defined between the first bottom cover portion 261 and the second bottom cover portion 262 by the extension area EA, and the sidewall part 252 has the cross-sectional shape having the increasing thickness. The volume of the defined in part by the sidewall part 262 may be larger when compared to that of a conventional structure in which the second bottom cover portion 262 extends vertically from the first bottom cover portion 261, and thus the heat discharge efficiency of the light source unit 210 may be improved.

In addition, due to the extension area EA, the light guide plate 220 may have the relatively larger size in the first and second directions DR1 and DR2 as compared to a conventional light guide plate. Therefore, light leakage may be reduced or effectively prevented at the edge of the light guide plate 220.

The light guide plate 220 thermally expands in the first and second directions DR1 and DR2 when heated, and further expands in the third direction DR3 when expansion of the light guide plate 220 is limited or blocked in the first and second directions DR1 and DR2 due to the light source unit 210. When the light guide plate 220 is expanded in the third direction DR3, pressure is applied to the display panel 100, thereby causing deterioration of the display quality of the display apparatus 1000. Since the distance between the light source unit 210 and the light guide plate 220 is maintained by the extension area EA in one or more exemplary embodiment of the invention, as compared to that of the conventional display apparatus, expansion of the light guide plate 220 in the third direction DR3 may be reduced or effectively prevented.

Figure 3:
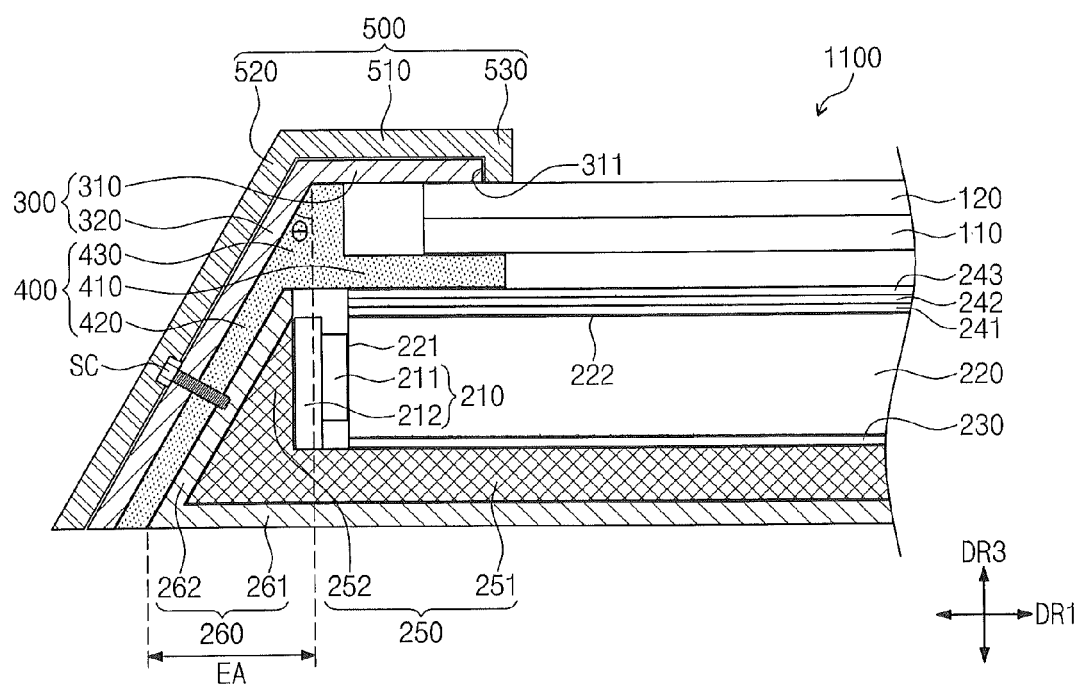
FIG. 3 is a cross-sectional view showing an enlarged portion of another exemplary embodiment of a display apparatus according to the invention.

FIG. 3 is a cross-sectional view showing an enlarged portion of another exemplary embodiment of a display apparatus 1100 according to the invention.

The display apparatus 1100 shown in FIG. 3 further includes a set frame 500 when compared to the display apparatus 1000 shown in FIGS. 1 and 2. Hereinafter, only the set frame 500 will be described in detail.

The set frame 500 covers the top cover 300. The set frame 500 is disposed at an outermost position of the display apparatus 1100, which is recognized by the user. Accordingly, the set frame 500 protects the display panel 100, the backlight unit 200, the top cover 300 and the mold frame 400 and effectively defines the external design of the display apparatus 1100.

The set frame 500 includes a first set frame portion 510, a second set frame portion 520, and a third set frame portion 530.

The first set frame portion 510 is disposed on the first top cover portion 310 and covers the first top cover portion 310. The first set frame portion 510 extends substantially in parallel to the first top cover portion 310.

The second set frame portion 520 is connected to a first (e.g., outer) end of the first set frame portion 510 and disposed on the second top cover portion 320 to cover the second top cover portion 320. The second set frame portion 520 extends substantially in parallel to the second top cover portion 320.

The third set frame portion 530 is connected to a second end of the first set frame portion 510 opposite to the first end, and disposed on the display panel 100 to cover a side distal surface 311 of the first top cover portion 310. An opening is defined in the set frame 500 and exposes the display panel 100.

Since the set frame 500 has the similar shape to that of the top cover 300, the set frame 500 is configured to cover the top cover 300. Due to the shape of the set frame 500, the top cover 300 is relatively adhered to the set frame 500, and thus a bezel of the display apparatus 1100 may be reduced.

Figure 4:
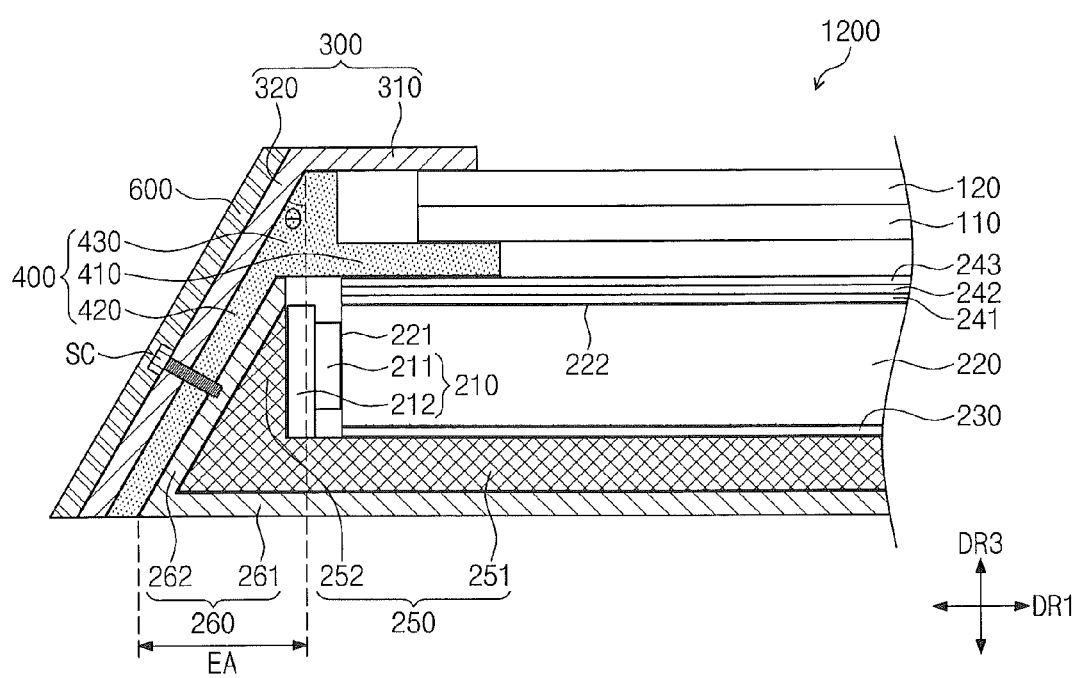
FIG. 4 is a cross-sectional view showing an enlarged portion of still another exemplary embodiment of a display apparatus according to the invention.

FIG. 4 is a cross-sectional view showing an enlarged portion of still another exemplary embodiment of a display apparatus 1200 according to the invention.

The display apparatus 1200 has the same structure and function as those of the display apparatus 1100 shown in FIG. 3 except for a set frame 600. Hereinafter, the set frame 600 will be described in detail.

Referring to FIG. 4, the set frame 600 is disposed on the second top cover portion 320 to cover the second top cover portion 320. The set frame 600 extends substantially in parallel to the second top cover portion 430.

The display apparatus 1200 shown in FIG. 4 has the same effect as the display apparatus 1100 shown in FIG. 3 and the first and third set frame portions 510 and 530 are removed from the display apparatus 1100. Therefore, a cross-sectional thickness of the display apparatus 1200 may be reduced as compared to that of the display apparatus 1100 shown in FIG. 3.

Figure 5:
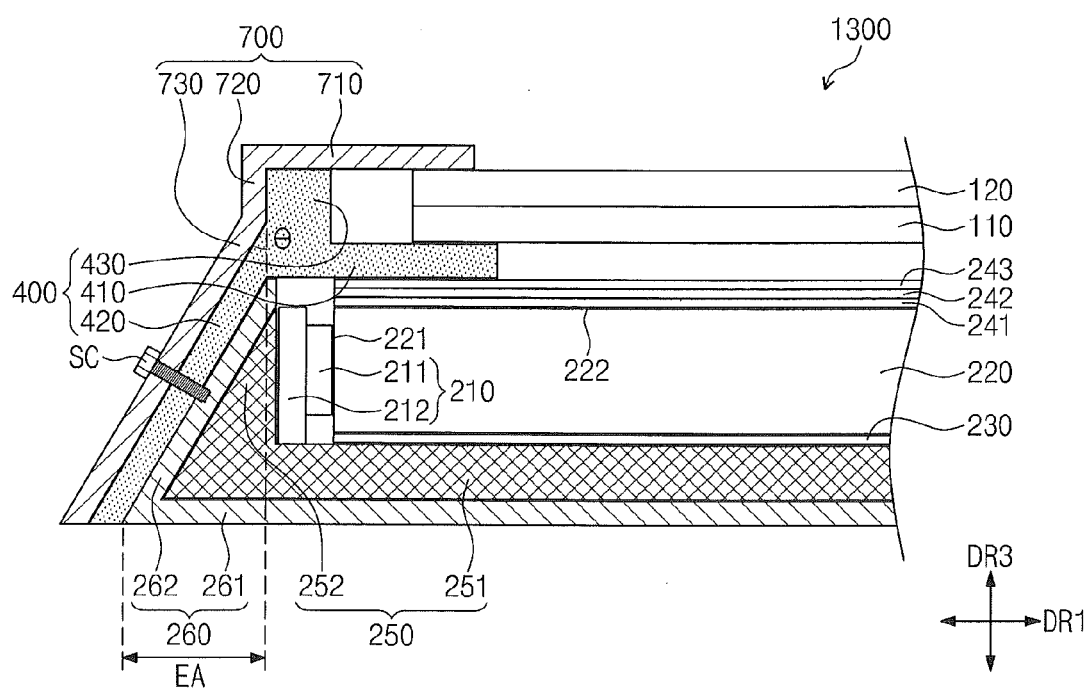
FIG. 5 is a cross-sectional view showing an enlarged portion of yet another exemplary embodiment of a display apparatus according to the invention.

FIG. 5 is a cross-sectional view showing an enlarged portion of yet another exemplary embodiment of a display apparatus 1300 according to the invention.

The display apparatus 1300 shown in FIG. 5 has the same structure and function as those of the display apparatus 1000 shown in FIGS. 1 an 2 except for a top cover 700. Hereinafter, the top cover 700 will be described in detail.

The top cover 700 covers a portion of the upper surface of the display panel 100 and is coupled to the mold frame 400 and the bottom cover 260.

The top cover 700 includes a first top cover portion 710, a second top cover portion 720 and a third top cover portion 730. The first top cover portion 710 covers an edge of the upper surface of the display panel 100. The first top cover portion 710 has a rectangular ring shape with an opening defined therein.

The second top cover portion 720 extends from the first top cover portion 710. The second top cover portion 720 covers a portion of a side surface of the display panel 100 and a portion of a side surface of the backlight unit 200.

The third top cover portion 730 extends from the second top cover portion 720. The third top cover portion 730 covers a remaining portion of the side surface of the display panel 100 and the remaining portion of the side surface of the backlight unit 200.

The first top cover portion 710 extends in a direction substantially parallel to the upper surface of the display panel 100. The second top cover portion 720 extends in a direction vertical to the direction in which the first top cover portion 710 extends. That is, the first top cover portion 710 and the second top cover portion 720 form a right angle. That is, the third top cover portion 730 extends in a direction inclined with respect to the direction in which the first top cover portion 710 extends.

An angle formed by the first and second top cover portions 710 and 720 may be an obtuse angle with respect to the plane defined by the first and second directions DR1 and DR2. In other words, an angle between the third top cover portion 730 and the third direction DR3 may be the acute angle ($\theta$).

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display apparatus comprising:
a display panel which displays an image;
a backlight unit which supplies a light to the display panel, the backlight unit comprising:
a light source unit which generates and provides the light to the display panel, and
a bottom cover comprising:
a bottom portion covering a rear surface of the light source unit, and
a sidewall portion extending from the bottom portion; and
a top cover disposed outside the bottom cover, the top cover comprising:
a top portion which covers an edge of an upper surface of the display panel, and
a sidewall portion which is connected to the top portion and covers a side surface of the display panel and an outer side surface of the sidewall portion of the bottom cover of the backlight unit,
the sidewall portion of the top cover extending in a direction inclined with respect to a direction in which the top portion extends to form an obtuse angle with the top portion of the top cover, wherein
the sidewall portion of the bottom cover extends in the same direction in which the sidewall portion of the top cover extends to be parallel to the sidewall portion of the top cover, and the sidewall portion of the bottom cover which extends in the same direction in which the sidewall portion of the top cover extends defines an edge of the backlight unit more outwardly protruded than an edge of the top portion of the top cover, in a plan view.

2. The display apparatus of claim 1, wherein an angle formed by the sidewall portion of the top cover and a thickness direction of the display panel is an acute angle.

3. The display apparatus of claim 1, wherein the backlight unit further comprises:
the light source unit comprising a light source which generates and emits the light, and a light source printed circuit board which drives the light source, the light source unit spaced apart from the sidewall portion of the bottom cover to define a space therebetween;
a light guide plate which guides the light provided from the light source and allows the light to travel upward therefrom toward the display panel;
a reflection plate which is under the light guide plate and reflects the light leaked from the light guide plate;
optical sheets which are on the light guide plate and increase a light efficiency of the light exiting from the light guide plate; and
a fixing bar which fixes the light source unit in the backlight unit and discharges heat generated from the light source unit.

4. The display apparatus of claim 1, further comprising a mold frame which is between the top cover and the bottom cover and coupled to the top cover and the bottom cover.

5. The display apparatus of claim 1, further comprising a set frame which is on the top cover and covers a portion of the top cover.

6. The display apparatus of claim 2, wherein the sidewall portion of the bottom cover which extends in the same direction in which the sidewall portion of the top cover extends forms an acute angle with the bottom portion of the bottom cover.

7. The display apparatus of claim 3, wherein the fixing bar comprises:
a bottom part on the bottom portion of the bottom cover; and
a sidewall part extending from the bottom part to be disposed in the space between the light source unit and the sidewall portion of the bottom cover,
wherein the light source unit is coupled to an inner surface of the sidewall part of the fixing bar.

8. The display apparatus of claim 7, wherein the sidewall part of the fixing bar has a shape corresponding to a space defined between the bottom portion of the bottom cover and the sidewall portion of the bottom cover.

9. The display apparatus of claim 8, wherein
the sidewall part of the fixing bar has a thickness which increases in a direction toward the bottom part of the fixing bar,
the sidewall part of the fixing bar has a inclined surface substantially parallel to the sidewall portion of the bottom cover.

10. The display apparatus of claim 4, wherein the mold frame comprises:
a first mold frame portion which extends in a direction substantially parallel to the top portion of the top cover and supports the display panel thereon; and a second mold frame portion extending in a direction substantially parallel to the sidewall portion of the top cover.

11. The display apparatus of claim 10, wherein an angle formed by the second mold frame portion and a thickness direction of the display panel is an acute angle.

12. The display apparatus of claim 10, further comprising an engaging member which is engaged with the sidewall portion of the top cover, the second mold frame portion of the mold frame and the sidewall portion of the bottom cover and penetrates the sidewall portion of the top cover, the second mold frame portion of the mold frame, and the sidewall portion of the bottom cover along a direction normal to the direction in which the sidewall portion of the top cover extends.

13. The display apparatus of claim 5, wherein the set frame comprises:
a first set frame portion which is on the top portion of the top cover and extends substantially parallel to the top portion of the top cover;
a second set frame portion which is connected to a first end of the first set frame portion and extends substantially parallel to the sidewall portion of the top cover; and
a third set frame portion which is connected to an opposing second end of the first set frame portion and covers a side surface of the top portion of the top cover.

14. The display apparatus of claim 5, wherein the set frame is on the sidewall portion of the top cover and extends substantially in parallel to the sidewall portion of the top cover.

15. A display apparatus comprising:
a display panel which displays an image;
a backlight unit which supplies a light to the display panel, the backlight unit comprising:
a light source unit which generates and provides the light to the display panel, and
a bottom cover comprising:
a bottom portion covering a rear surface of the light source unit, and
a sidewall portion extending from the bottom portion; and
a top cover disposed outside the bottom cover, the top cover comprising:
a top portion which covers an edge of an upper surface of the display panel,
a first sidewall portion which is connected to the top portion and covers a portion of a side surface of the display panel and a portion of a side surface of the backlight unit, and
a second sidewall portion which extends from the first sidewall portion, covers a remaining portion of the side surface of the display panel and an outer side surface of the sidewall portion of the bottom cover of the backlight unit,
the sidewall portion of the top cover extending in a direction inclined with respect to a direction in which the top portion extends to form an obtuse angle with the top portion of the top cover,
wherein
the sidewall portion of the bottom cover extends in the same direction in which the sidewall portion of the top cover extends to be parallel to the second sidewall portion of the top cover, and
the sidewall portion of the bottom cover which extends in the same direction in which the sidewall portion of the top cover extends defines an edge of the backlight unit more outwardly protruded than an edge of the top portion of the top cover, in a plan view.

16. The display apparatus of claim 15, wherein the top portion of the top cover and the first sidewall portion of the top cover form a right angle.

17. The display apparatus of claim 15, wherein the backlight unit further comprises:
- a light source unit comprising a light source which generates and emits the light, and a light source printed circuit board which drives the light source;
- a light guide plate which guides the light provided from the light source and allows the light to travel upward therefrom toward the display panel;
- a reflection plate which is under the light guide plate and reflects the light leaked from the light guide plate;
- optical sheets which are on the light guide plate and increase a light efficiency of the light exiting from the light guide plate; and
- a fixing bar which fixes the light source unit and discharges heat generated from the light source unit, and comprises:
  - a bottom part on the bottom portion of the bottom cover; and
  - a sidewall part extending from the bottom part,
  - wherein the light source unit is coupled to an inner surface of the sidewall part.

18. The display apparatus of claim 16, wherein an angle formed by the second sidewall portion of the top cover and a thickness direction of the display panel is an acute angle.

19. The display apparatus of claim 17, wherein the sidewall part of the fixing bar has a thickness which increases in a direction toward the bottom part of the fixing bar.

* * * * *